US011521198B2

(12) United States Patent
Pronski et al.

(10) Patent No.: US 11,521,198 B2
(45) Date of Patent: Dec. 6, 2022

(54) SYSTEMS AND METHODS FOR REAL-TIME VIRTUAL GIFT CARD PURCHASING

(71) Applicant: The Toronto-Dominion Bank, Toronto (CA)

(72) Inventors: Michael Pronski, Toronto (CA); Buturab Rizvi, Vaughan (CA)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

(21) Appl. No.: 16/739,696

(22) Filed: Jan. 10, 2020

(65) Prior Publication Data
US 2021/0216999 A1    Jul. 15, 2021

(51) Int. Cl.
*G06Q 20/40* (2012.01)
*G06Q 20/32* (2012.01)
*G06Q 20/38* (2012.01)
*H04L 29/06* (2006.01)
*G06Q 50/00* (2012.01)
*G06F 16/28* (2019.01)
(Continued)

(52) U.S. Cl.
CPC ......... *G06Q 20/354* (2013.01); *G06Q 20/047* (2020.05); *G06Q 20/0457* (2013.01); *G06Q 20/349* (2013.01); *G06Q 20/351* (2013.01); *G06Q 20/4016* (2013.01)

(58) Field of Classification Search
CPC .. G06Q 20/354; G06Q 20/047; G06Q 20/351; G06Q 20/349; G06Q 20/0457; G06Q 20/4016
See application file for complete search history.

(56) References Cited

U.S. PATENT DOCUMENTS

| 8,523,054 B2 * | 9/2013 | Yankovich ......... G06Q 20/3223 235/379 |
| 9,524,500 B2 | 12/2016 | Dave et al. |
| 2012/0316983 A1 | 12/2012 | Shinnebarger et al. |

(Continued)

OTHER PUBLICATIONS

U.S. Payments Forum, "Mobile and Digital Wallets: U.S. Landscape and Strategic Considerations for Merchants and Financial Institutions," Version 1, Jan. 2018 (Year: 2018).*

(Continued)

*Primary Examiner* — Daniel S Felten
*Assistant Examiner* — Douglas W Pinsky
(74) *Attorney, Agent, or Firm* — Rowand LLP

(57) ABSTRACT

A computer-implemented method for allowing purchase of virtual gift cards includes receiving a communication indicating a gift card type and specifying a value amount. Responsive to the communication, a purchase of a virtual gift card of that type and storing that value amount is processed. This processing includes processing a payment for the specified value amount. Further, a gift card merchant application programming interface (API) capable of processing a purchase of a virtual gift card of the indicated gift card type is identified from amongst a set of such APIs. That API is used to initiate purchase of the virtual gift card. After the purchase is processed, an indication of the purchased virtual gift card is sent to a mobile computing device. The mobile computing device uses the indication to configure itself to allow transactions using the purchased virtual gift card to be initiated. Fraud detection may also be performed.

19 Claims, 7 Drawing Sheets

(51) Int. Cl.
*G06Q 20/04* (2012.01)
*G06Q 20/34* (2012.01)

(56) References Cited

U.S. PATENT DOCUMENTS

| | | |
|---|---|---|
| 2012/0323787 A1 | 12/2012 | Nelsen |
| 2013/0275189 A1 | 10/2013 | Goff et al. |
| 2013/0290172 A1* | 10/2013 | Mashinsky ............ G06Q 20/28 705/39 |
| 2013/0304559 A1 | 11/2013 | Stone et al. |
| 2014/0136349 A1* | 5/2014 | Dave ...................... G06Q 20/12 705/16 |
| 2014/0164093 A1 | 6/2014 | Libman |
| 2014/0195425 A1* | 7/2014 | Campos ............. G06Q 20/3674 705/41 |
| 2015/0088753 A1* | 3/2015 | Van Der Schueren ...................... G06Q 20/382 705/67 |
| 2016/0104206 A1 | 4/2016 | Greenberg et al. |
| 2016/0247238 A1* | 8/2016 | Kunapuli ............... G06Q 40/12 |
| 2018/0053157 A1* | 2/2018 | Roffey ............. G06K 19/06206 |
| 2019/0129773 A1* | 5/2019 | Suter .................... G06F 11/3612 |
| 2019/0164148 A1* | 5/2019 | Suh ..................... G06Q 30/0207 |
| 2019/0197504 A1* | 6/2019 | Soriano ................ G06Q 20/204 |
| 2019/0349210 A1* | 11/2019 | Nayak ................... H04M 15/58 |

OTHER PUBLICATIONS

Unknown: "Gyft Reports Integration of Gift Cards with Google Wallet", Wireless News; Jacksonville, date of publication: Jul. 23, 2014.

Borrego-Jaraba et al.: "A Ubiquitous NFC Solution for the Development of Tailored Marketing Strategies Based on Discount Vouchers and Loyalty Cards", Sensors 2013, 13(5), 6334-6354; doi:10.3390/s130506334; May 14, 2013.

* cited by examiner

SYSTEMS AND METHODS FOR REAL-TIME VIRTUAL GIFT CARD PURCHASING

FIELD

This relates to application programming interfaces (APIs), and, more particularly, to the use of disparate APIs for managing virtual gift cards, and, yet more particularly, to how such APIs may be selectively utilized to provide for purchasing of virtual gift cards of different types in real-time or near real-time.

BACKGROUND

Many merchants offer and/or accept gift cards. Such gift cards may be loaded with a value which may then be redeemed for purchases from the merchant. In some cases, gift cards may also be reloaded.

Recently, some merchants have begun to offer virtual gift cards. Typically, these virtual gift cards are purchased and then, sometime later after back-end processing completes, are delivered to the intended recipient by way of an email. For example, an email may be provided to the customer that includes a barcode that, when printed or displayed on a mobile device, may be scanned at point-of-sale in order to make purchases using the virtual gift card to which a given such barcode corresponds. In some cases, the time to receive the virtual gift card (including the back-end processing and email delays) might take noticeable amounts of time such as, for example, possibly several minutes or even hours.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EXAMPLE EMBODIMENTS

Figure 1:
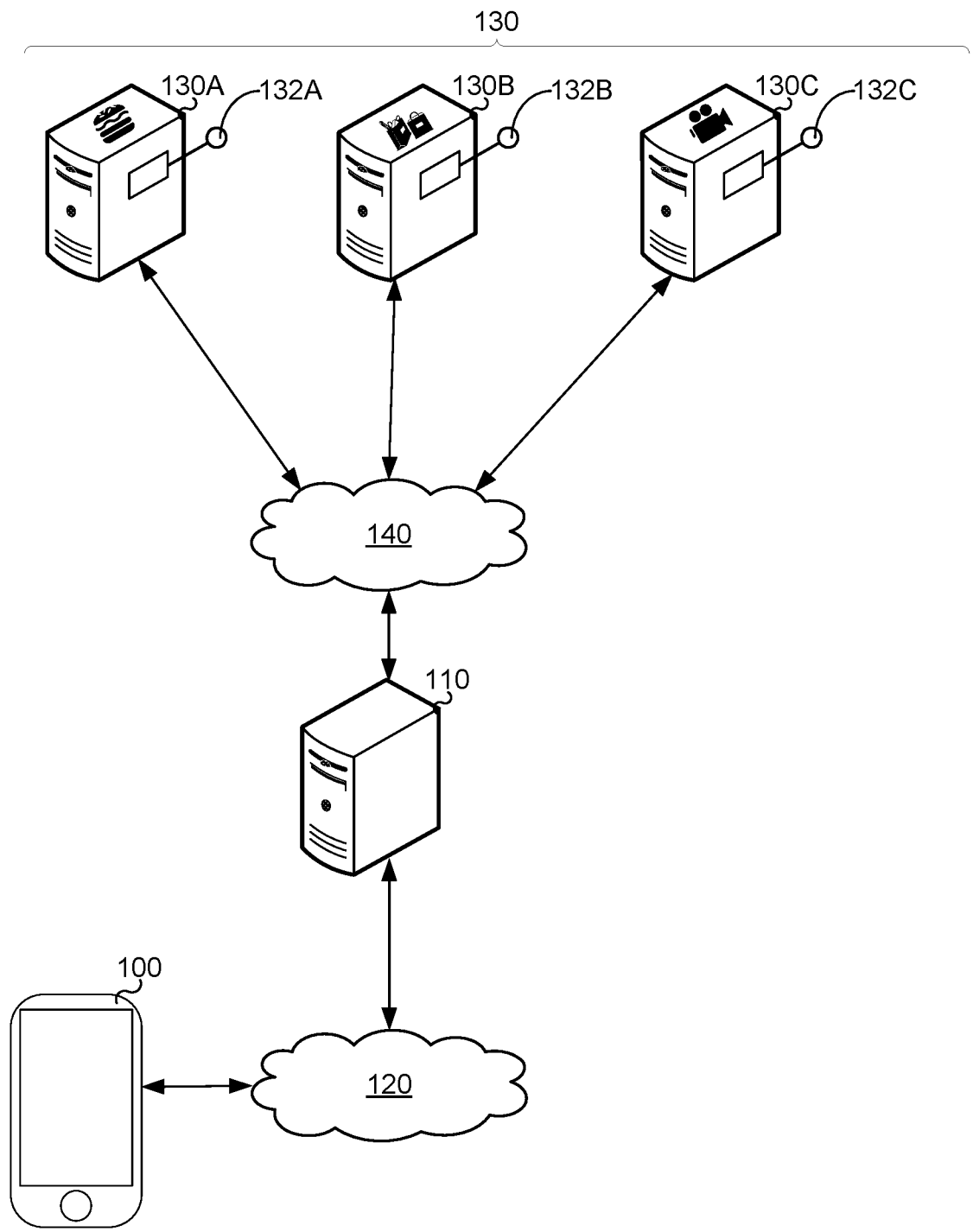
FIG. 1 is a schematic operation diagram illustrating an operating environment of an example embodiment according to the subject matter of the present application.

According to the subject matter of the present application there may be provided a computer system. The computer system may include a processor, a communications module, and/or a memory. The communications module and/or the memory may be coupled to the processor. The memory may store instructions that, when executed by the processor, cause the computer system to: receive, using the communications module via a network, a communication indicating a gift card type and specifying a value amount; and responsive to the communication, process, in at least near real-time, a purchase of a virtual gift card of the indicated gift card type storing the specified value amount. The processing may include: processing a payment corresponding to the specified value amount; identifying, from amongst a plurality of gift card merchant application programming interfaces, a gift card merchant application programming interface capable of processing a purchase of a virtual gift card of the indicated gift card type storing the specified value amount; and using the identified gift card merchant application programming interface to initiate purchase of a virtual gift card of the indicated gift card type storing the specified value amount. The instructions, when executed, may further cause the computer system to: send an indication of the purchased virtual gift card via the network using the communications module to a mobile computing device for use in configuring the mobile computing device to allow transactions using the purchased virtual gift card to be initiated using the mobile computing device.

Conveniently, in this way, a virtual gift card may be purchased in real-time or at least near real-time. More particularly, an API capable of servicing such a purchase for a selected type of virtual gift card is identified and used in purchasing and/or reloading a virtual gift card. Notably, the API is identified from amongst a group of different APIs, each of which may be capable of purchasing gift cards of one or more different types. The virtual gift card is then purchased immediately or nearly immediately and made available for making purchases.

In some implementations, the gift card merchant application programming interface may be identified based on the indicated gift card type.

In some implementations, the identified gift card merchant application programming interface may utilize a particular messaging protocol. It may be that using the identified gift card merchant application programming interface to initiate purchase of a virtual gift card includes generating a message in conformity with the particular messaging protocol for invoking the identified gift card merchant application programming interface.

In some implementations, the communication indicating the gift card type and specifying the value amount may be received from the mobile computing device.

In some implementations, the communication may correspond to a request received from the mobile computing device. It may be that the indication of the purchase of the virtual gift card corresponds to a synchronous reply to that request.

In some implementations, the communication indicating the gift card type and specifying the value amount may be received from a different computing device from the mobile computing device.

In some implementations, the indication of the purchased virtual gift card may include an email message.

In some implementations, processing the purchase of the virtual gift card may further include: prior to processing the payment, performing fraud detection to determine that a purchase of the virtual gift card of the indicated gift card type storing the specified value amount will not be blocked as possible fraud.

In some implementations, performing fraud detection to determine that a purchase of the virtual gift card of the indicated gift card type storing the specified value amount will not be blocked as possible fraud may include obtaining information including information related to two or more of the indicated gift card type, the specified value amount, an intended purchaser of the virtual gift card, an intended recipient of the virtual gift, prior purchases of virtual gift cards, or a computing device from which the communication indicating the gift card type and specifying the value amount was received; and assessing the purchase by evaluating a plurality of fraud detection rules based on the obtained information using a rules engine to determine that a purchase of the virtual gift card of the indicated gift card type storing the specified value amount will not be blocked as possible fraud.

In some implementations, performing fraud detection to determine that a purchase of the virtual gift card of the indicated gift card type storing the specified value amount will not be blocked as possible fraud may include: identifying a purchase limit based on an identified level of fraud risk; and determining that the specified value amount is less than the purchase limit.

In some implementations, performing fraud detection to determine that a requested purchase of the virtual gift card of the indicated gift card type storing the specified value amount will not be blocked as possible fraud may include: sending, to a remote fraud detection computer system using the communications module via the network, a second communication including an indication of one or more parameters of the requested virtual gift card purchase including at least one of the indicated gift card type and the specified value amount for use in performing fraud detection; and receiving, from the remote fraud detection computer system using the communications module via the network responsive to the second communication, an indication of a fraud risk level associated with the requested virtual gift card purchase.

In some implementations, the purchase of the virtual gift card of the indicated gift card type storing the specified value amount may correspond to a reload of an existing virtual gift card whereby the specified value amount is added to the existing virtual gift card.

According to the subject matter of the present application, there may be provided a computer-implemented method. The method may include receiving, via a network, a communication indicating a gift card type and specifying a value amount; and responsive to the communication, processing, in at least near real-time, a purchase of a virtual gift card of the indicated gift card type storing the specified value amount. The processing may include: processing a payment corresponding to the specified value amount; identifying, from amongst a plurality of gift card merchant application programming interfaces, a gift card merchant application programming interface capable of processing a purchase of a virtual gift card of the indicated gift card type storing the specified value amount; and using the identified gift card merchant application programming interface to initiate purchase of a virtual gift card of the indicated gift card type storing the specified value amount. The method may further include: sending an indication of the purchased virtual gift card via the network to a mobile computing device for use in configuring the mobile computing device to allow transactions using the purchased virtual gift card to be initiated using the mobile computing device.

In some implementations, the gift card merchant application programming interface may be identified based on the indicated gift card type.

In some implementations, the identified gift card merchant application programming interface may utilize a particular messaging protocol. It may be that using the identified gift card merchant application programming interface to initiate purchase of a virtual gift card includes generating a message in conformity with the particular messaging protocol for invoking the identified gift card merchant application programming interface.

In some implementations, the communication indicating the gift card type and specifying the value amount may be received from the mobile computing device.

In some implementations, the communication indicating the gift card type and specifying the value amount may be received from a different computing device from the mobile computing device.

In some implementations, processing the purchase of the virtual gift card may further include: prior to processing the payment, performing fraud detection to determine that a purchase of the virtual gift card of the indicated gift card type storing the specified value amount will not be blocked as possible fraud.

In some implementations, performing fraud detection to determine that a purchase of the virtual gift card of the indicated gift card type storing the specified value amount will not be blocked as possible fraud may include: obtaining information including information related to two or more of the indicated gift card type, the specified value amount, an intended purchaser of the virtual gift card, an intended recipient of the virtual gift, prior purchases of virtual gift cards, or a computing device from which the communication indicating the gift card type and specifying the value amount was received; and assessing the purchase by evaluating a plurality of fraud detection rules based on the obtained information using a rules engine to determine that a purchase of the virtual gift card of the indicated gift card type storing the specified value amount will not be blocked as possible fraud.

In some implementations, there may be provided a computer-readable storage medium. The computer-readable storage medium may be a non-transitory computer-readable storage medium. The computer-readable storage medium may store instructions which, when executed by a processor of a computer system, cause the computer system to: receive, via a network, a communication indicating a gift card type and specifying a value amount; and responsive to the communication, process, in at least near real-time, a purchase of a virtual gift card of the indicated gift card type storing the specified value amount. The processing may include: processing a payment corresponding to the specified value amount; identifying, from amongst a plurality of gift card merchant application programming interfaces, a gift card merchant application programming interface capable of processing a purchase of a virtual gift card of the indicated gift card type storing the specified value amount; and using the identified gift card merchant application programming interface to initiate purchase of a virtual gift card of the indicated gift card type storing the specified value amount. The instructions, when executed, may further cause the computer system to: send an indication of the purchased virtual gift card via the network to a mobile computing device for use in configuring the mobile computing device to allow transactions using the purchased virtual gift card to be initiated using the mobile computing device.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

FIG. 1 is a schematic operation diagram illustrating an operating environment of an example embodiment.

As illustrated, a client computer system 100 is in communication with a server computer system 110 via a first network 120. The client computer system 100 is geographically remote from the server computer system 110 and vice-versa.

The server computer system 110 is also in communication with a set of gift card merchant computer server systems 130 via a second network 140. For example, as illustrated, the server computer system 110 may be in communication with a first gift card merchant computer server system 130A, a second gift card merchant computer server system 130B, and a third gift card merchant computer server system 130C, all via the second network 140.

The client computer system 100 may be a mobile computing device such as, for example, a smart phone as shown in the FIG. 1. However, the client computer system 100 may be a computing device of another type such as, for example, a personal computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 110 and each member of the set of gift card merchant computer server systems 130 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The first network 120 and the second network 140 are computer networks. In some embodiments, one or both of the first network 120 and the second network 140 may be an internetwork such as may be formed of one or more interconnected computer networks. For example, such a network may be or may include an Ethernet network, an asynchronous transfer mode (ATM) network, a wireless network, or the like. In some embodiments, the first network 120 and the second network 140 may be the same network. For example, the first network 120 and the second network 140 could both be the Internet.

As further described below, the client computer system 100 may be configured with software to allow it to act as a mobile wallet. For example, the client computer system 100 may be configured with a mobile wallet application that allows it to be used for making purchases such as, for example, by displaying a machine-readable indicium (e.g., a bar code) associated with a payment method and/or by performing transactions using near-field communication (NFC). In a particular example, the mobile wallet application may store one or more virtual gift cards that store value, each of which may be used to make purchases from one or more merchants that are associated therewith and/or that accept virtual gift cards of a given type.

The server computer system 110 allows the purchase and/or the reloading of virtual gift cards in real-time and/or near real-time. Clients may communicate with the server computer system 110 to cause virtual gift cards to be purchased and/or reloaded, with those purchased cards and or the reloaded value (as the case may be) then becoming available for immediate or nearly-immediate use. For example, as further described below, the client computer system 100 may co-operate with the server computer system 110 via the first network 120 to effect a purchase of a virtual gift card such as, for example, to purchase a new virtual gift to be added to its mobile wallet application and/or to reload an existing virtual gift card such as, for example, one already provisioned in the mobile wallet application.

The server computer system 110 co-operates with the set of gift card merchant computer server systems 130 via the second network 140 to effect purchases/reloads of virtual gift cards. More particularly, the server computer system 110 may, as further described below, receive communications identifying virtual gift cards to be acquired/reloaded and may then identify a relevant member of the set of gift card merchant computer server systems 130 (e.g., one of the first gift card merchant computer server system 130A, the second gift card merchant computer server system 130B, or the third gift card merchant computer server system 130C) in order to effect purchase of those virtual gift cards. Yet more particularly, to effect such purchases, the server computer system 110 may invoke one or more functions exposed by application programming interfaces (APIs) provided by a given member of the set of gift card merchant computer server systems 130. For example, as illustrated, each of the first gift card merchant computer server system 130A, the second gift card merchant computer server system 130B, and the third gift card merchant computer server system 130C provides a respective gift card application programming interface (API), namely a first gift card merchant API 132A, a second gift card merchant API 132B, and a third gift card merchant API 132C.

Figure 2:
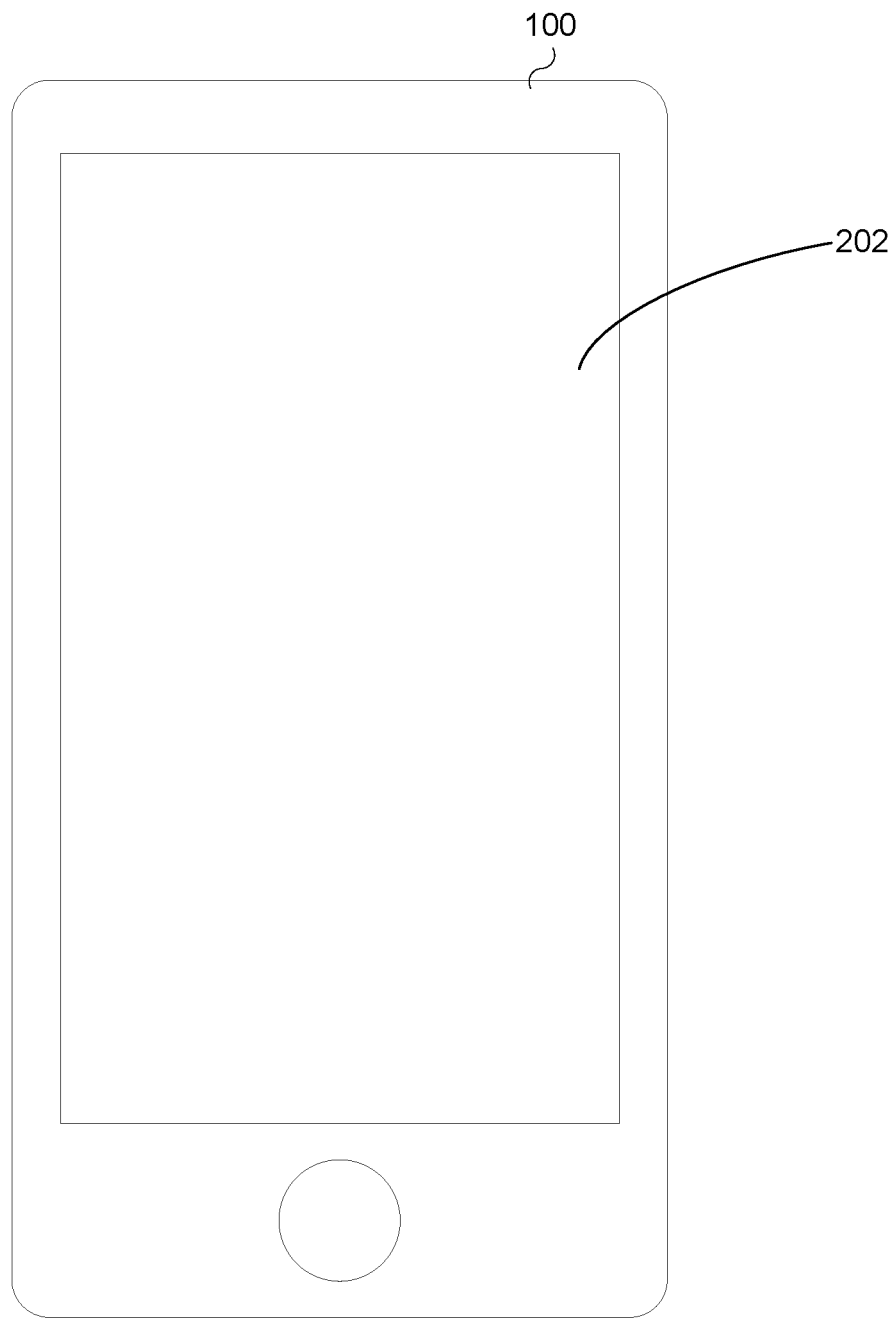
FIG. 2 shows the front side of a mobile computer system.

An example embodiment of the client computer system 100 will now be discussed with reference to FIGS. 2 and 3. The client computer system 100 may, in some embodiments, be a smartphone as shown in FIG. 2. In other embodiments, the client computer system 100 may be another form of computer system. For example, the client computer system 100 may be another form of mobile computing device such as, for example, a tablet.

Referring now to FIG. 2, the front of the client computer system 100 includes a display 202. The display 202 is a module of the client computer system 100. The display 202 is for presenting graphics. The display 202 may be, for example, a liquid crystal display (LCD). In addition to being an output device, the display 202 may also be an input device. For example, the display 202 may allow touch input to be provided to the client computer system 100. In other words, the display 202 may be a touch sensitive display module. In a particular example, the display 202 may be a capacitive touch screen.

Figure 3:
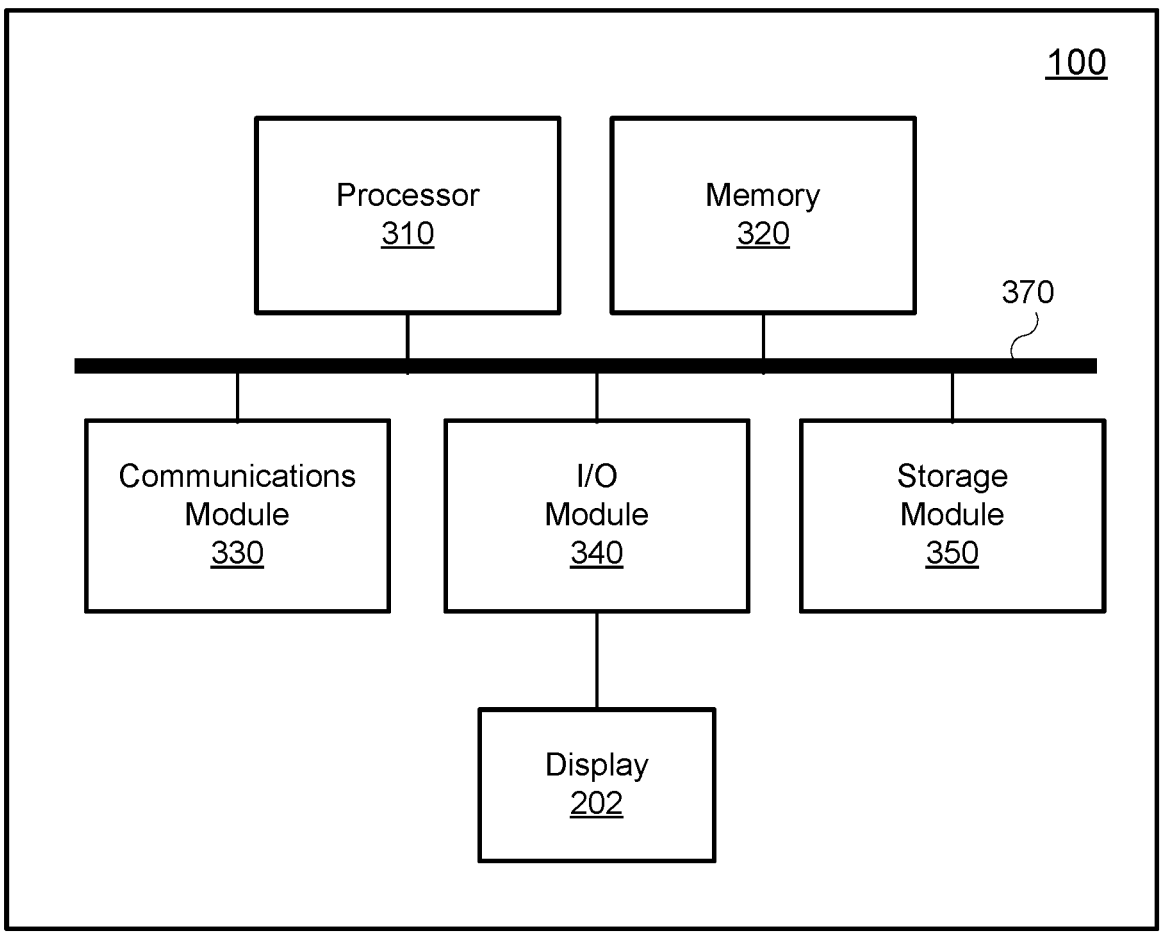
FIG. 3 shows a high-level schematic diagram of the mobile computer system of FIG. 2.

FIG. 3 is a high-level schematic diagram of the client computer system 100. The client computer system 100 includes a variety of modules. For example, as illustrated, the client computer system 100 may include a processor 310, a memory 320, a communications module 330, an I/O module 340, and/or a storage module 350. As illustrated, the foregoing example modules of the client computer system 100 are in communication over a bus 370. As such, the bus 370 may be considered to couple the various modules of the client computer system 100 to each other, including, for example, to the processor 310.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the client computer system 100.

The communications module 330 allows the client computer system 100 to communicate with other computing devices and/or various communications networks such as, for example, the first network 120. For example, the communications module 330 may allow the client computer system 100 to send or receive communications signals. Communications signals may be sent or received according to one or more protocols or according to one or more standards. The communications module 330 may allow the client computer system 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the client computer system 100 to communicate using near-field communication (NFC), via Wi-Fi™, using Bluetooth™ or via some combination of one or more networks or protocols. In some embodiments, all or a portion of the communications module 330 may be integrated into a component of the client computer system 100. For example, the communications module 330 may be integrated into a communications chipset.

The I/O module 340 is an input/output module. The I/O module 340 allows the client computer system 100 to receive input from and/or to provide input to components of the client computer system 100 such as, for example, various input modules and output modules. For example, the I/O module 340 may, as shown, allow the client computer system 100 to receive input from and/or provide output to the display 202.

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in/from a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 330. In some embodiments, the storage module 350 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
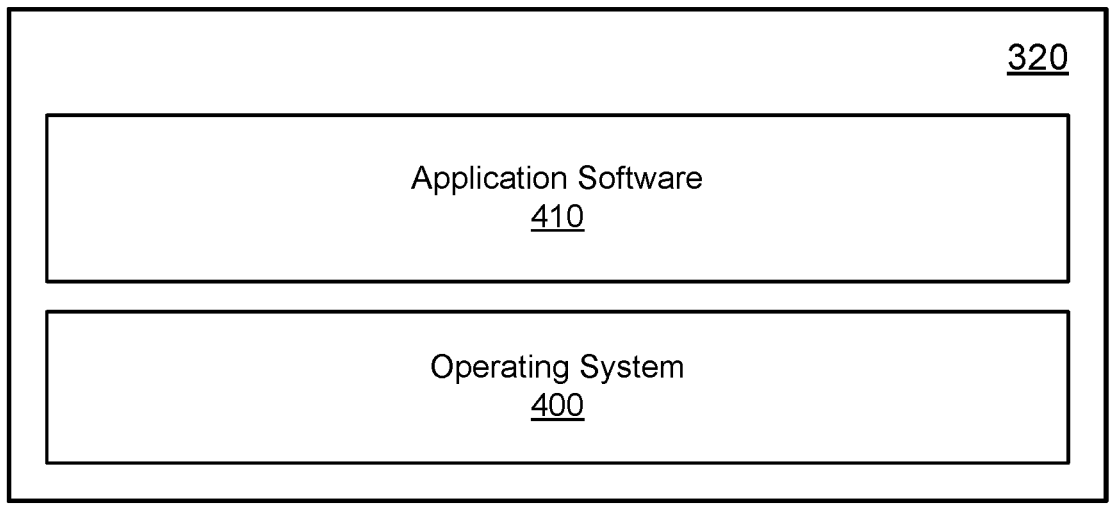
FIG. 4 shows a simplified organization of software components stored in a memory of the mobile computer system of FIG. 2.

FIG. 4 depicts a simplified organization of software components stored in the memory 320 of the client computer system 100. As illustrated, these software components include an operating system 400 and an application software 410.

The operating system 400 is software. The operating system 400 allows the application software 410 to access the processor 310 (FIG. 3), the memory 320, the communications module 330, the I/O module 340, and the storage module 350 of the client computer system 100. The operating system 400 may be, for example, Google™ Android™, Apple™ iOS™, UNIX™, Linux™, Microsoft™ Windows™, Apple OSX™ or the like.

The application software 410 adapts the client computer system 100, in combination with the operating system 400, to operate as a device for using and/or purchasing virtual gift cards.

Where the client computer system 100 is a smartphone or tablet, the application software 410 may be or may be a part of a smartphone or tablet application or "app". In a particular example, the application software 410 may be or may include a mobile wallet application as mentioned above.

As mentioned above, each of the server computer system 110 and the members of the set of gift card merchant computer server systems 130 (e.g., the first gift card merchant computer server system 130A, the second gift card merchant computer server system 130B, and the set of first gift card merchant computer server system 130AC) is a computer system. An example computer server system 500 will now be discussed with reference to FIGS. 5 and 6. Suitably-configured instances of the example computer server system 500 may, in some embodiments, serve as and/or be a part of the server computer system 110 and/or of one or more members of the set of gift card merchant computer server systems 130.

Figure 5:
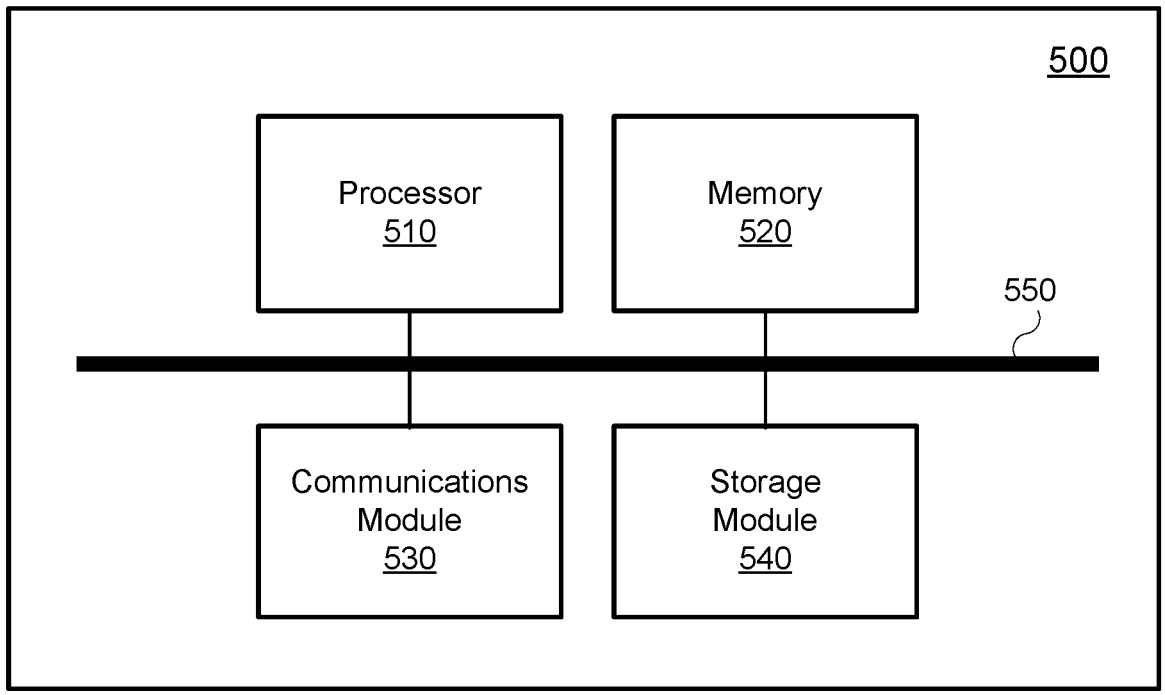
FIG. 5 is high-level schematic diagram of an example server computer system.

FIG. 5 is a high-level schematic diagram of an example computer server system 500.

The example computer server system 500 includes a variety of modules. For example, as illustrated, the example computer server system 500 may include a processor 510, a memory 520, a communications module 530, and/or a storage module 540. As illustrated, the foregoing example modules of the example computer server system 500 are in communication over a bus 550. As such, the bus 550 may be considered to couple the various modules of the example computer server system 500 to each other, including, for example, to the processor 510.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer server system 500.

The communications module 530 allows the example computer server system 500 to communicate with other computing devices and/or various communications networks such as, for example, the first network 120 and/or the second network 140. The communications module 530 may allow the example computer server system 500 to send or receive communications signals. Communications signals may be sent or received according to one or more protocols or according to one or more standards. For example, the communications module 530 may allow the example computer server system 500 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 530 may allow the example computer server system 500 to communicate via Wi-Fi™, using Bluetooth™ or via some combination of one or more networks or protocols. In some embodiments, all or a portion of the communications module 530 may be integrated into a component of the example computer server system 500. For example, the communications module may be integrated into a communications chipset.

The storage module 540 allows the example computer server system 500 to store and retrieve data. In some embodiments, the storage module 540 may be formed as a part of the memory 520 and/or may be used to access all or a portion of the memory 520. Additionally or alternatively, the storage module 540 may be used to store and retrieve data from persisted storage other than the persisted storage (if any) accessible via the memory 520. In some embodiments, the storage module 540 may be used to store and retrieve data in a database. A database may be stored in persisted storage. Additionally or alternatively, the storage module 540 may access data stored remotely such as, for example, as may be accessed using a local area network (LAN), wide area network (WAN), personal area network (PAN), and/or a storage area network (SAN). In some embodiments, the storage module 540 may access data stored remotely using the communications module 530. In some embodiments, the storage module 540 may be omitted and its function may be performed by the memory 520 and/or by the processor 510 in concert with the communications module 530 such as, for example, if data is stored remotely.

Software comprising instructions is executed by the processor 510 from a computer-readable medium. For example, software may be loaded into random-access memory from persistent storage of the memory 520. Additionally or alternatively, instructions may be executed by the processor 510 directly from read-only memory of the memory 520.

Figure 6:
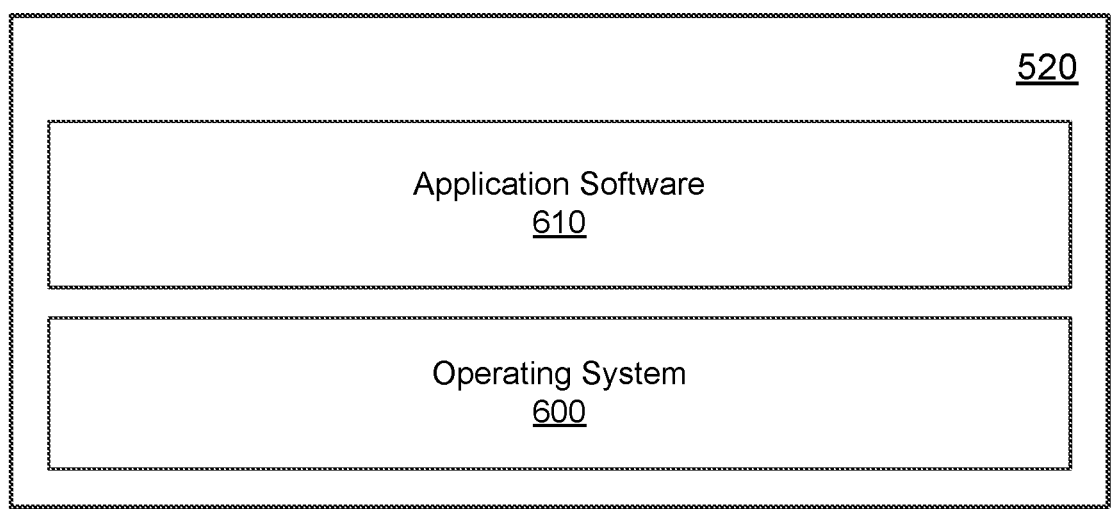
FIG. 6 shows a simplified organization of software components stored in the example server computer system of FIG. 5.

FIG. 6 depicts a simplified organization of software components stored in the memory 520 of the example computer server system 500. As illustrated, these software components include an operating system 600 and an application software 610.

The operating system 600 is software. The operating system 600 allows the application software 610 to access the processor 510, the memory 520, the communications module 530, and the storage module 540 of the example computer server system 500. The operating system 600 may be, for example, UNIX™, Linux™, Microsoft™ Windows™, Apple OSX™ or the like.

The application software 610, when executed, co-operates with the operating system 600 to adapt the example computer server system 500 for some purpose and to provide some defined functionality. For example, the application software 610 may cooperate with the operating system 600 to adapt a suitable embodiment of the example computer server system 500 to serve as the server computer system 110 or as one of the members of the set of gift card merchant computer server systems 130.

As mentioned above, server computer system 110 allows the purchase of new virtual gift cards and/or the reloading of existing virtual gift cards (broadly referred to herein as purchasing a virtual gift card) collectively in real-time or near real-time. An example manner of facilitating such a purchase will now be discussed with reference to FIG. 7.

Figure 7:
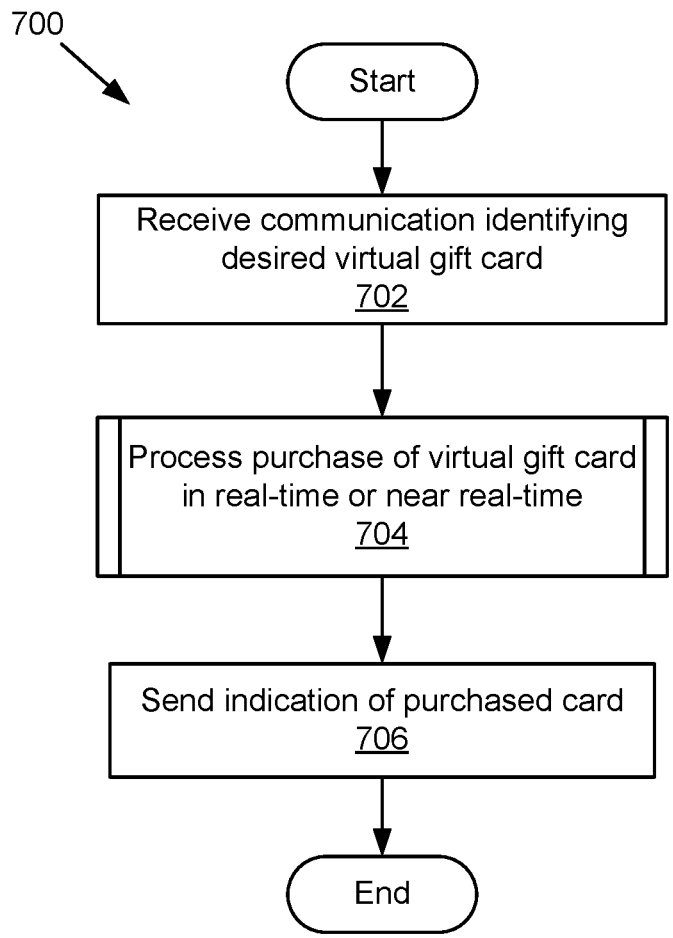
FIG. 7 is a flowchart showing operations performed in processing a request for purchase of a virtual gift card.

FIG. 7 provides a flowchart illustrating a method 700 for processing a request for a purchase of a virtual gift card. In performing the method 700, operations starting from an operation 702 and continuing onward are performed by a processor of the server computer system 110. For example, where the server computer system 110 is or includes an instance of the example computer server system 500, the operations may be performed by the processor 510 executing instructions such as, for example, from the memory 520. Those instructions may, for example, be part of a suitable instance of the application software 610 (FIG. 6).

At the operation 702, a communication is received identifying characteristics of a virtual gift card that is to be purchased. The communication is, in effect, to request for the virtual gift card to be purchased. The communication may be received via a network such as, for example, via the first network 120. Where the server computer system 110 is or includes an instance of the example computer server system 500, the communication may be received using the communications module 530.

As mentioned above, the communication identifies characteristics of the virtual gift card to be purchased. For example, the communication may indicate a type of virtual gift card to be purchased. In a particular example, a type of virtual gift card may correspond to a particular merchant (e.g., by being a gift card for spending at that merchant). In addition or as an alternative to including the type of the virtual gift to be purchased, the communication may specify a value of the virtual gift card to be purchased. Of course, the aforementioned characteristics are by way of example and other characteristics may, additionally or alternatively, be identified in the communication. For example, where the purchase corresponds to a reload of an existing virtual gift card rather than a purchase of a new virtual gift card, the communication may include an identifier (e.g., a gift card number) associated with the virtual gift card that is to be reloaded. Notably, such an identifier may, as it indicates a particular virtual gift card that is necessarily of a particular gift card type, may be considered an indication of gift card type.

The communication may be received from a variety of sources. For example, it may be that the communication is received from the client computer system 100. This may, for example, be the case where the client computer system 100 is being used to purchase a new virtual gift card to be stored in or to reload a virtual gift card stored in association with a mobile wallet application thereof. In another example, the communication may be received from a different computing device from the client computer system 100. For example, the communication could be received from a computer system being used to initiate a purchase of a new virtual gift card as a gift for another person/entity such as may, for example, be associated with the client computer system 100.

Following receipt of the communication at the operation 702, an operation 704 is next.

At the operation 704, responsive to the communication received at the operation 702, the server computer system 110 processes a purchase of a virtual gift card satisfying the characteristics identified in the communication (e.g., a virtual gift card of the indicated card type storing the specified value amount as identified by the communication). Notably, this processing may take a variety of forms. Example manners of completing this processing are described below. However, regardless of the form or manner of such processing, importantly, the processing is completed is at least near real-time—i.e., in real-time (within a few hundred milliseconds, e.g., less than 200 milliseconds in some embodiments) or near real-time (within a number of seconds, e.g., less than 15 seconds in at least some embodiments).

Following the purchase of the virtual gift card at the operation 704, an operation 706 is next.

At the operation 706, an indication of the virtual gift card purchased responsive to the operation 704 is sent to the client computer system 100. The indication may be sent for use in configuring the client computer system 100 to allow transactions using the purchased virtual gift card (e.g., purchases) to be initiated using that mobile computing device. For example, the indication may be for use in configuring a mobile wallet application of the client computer system 100 with that virtual gift card so as to allow, for example, the mobile wallet application to be used to initiate transactions using that virtual gift card.

The indication of the virtual gift card may be a communication sent to the client computer system 100 via a network such as, for example, the first network 120. Where the server computer system 110 is or includes an instance of the example computer server system 500, the communication may be sent using the communications module 530.

However conveyed, the indication may take a variety of forms. In each case, however, the indication will serve to enable configuration of the client computer system 100 for using in initiating transactions using the virtual gift card. Possible example forms of providing such an indication will now be discussed.

As a first example of a possible form of the indication, where the communication at the operation 702 was received from the client computer system 100, the indication may be considered a reply to the communication. In a particular example, where the communication corresponds to a request received from the client computer system 100, the indication of the purchase of the virtual gift card may be considered a reply to that request. More particularly, since the virtual gift card is purchased in real-time or at least near real-time, the reply could be considered a synchronous reply to a request received at the operation 702. For example, it may be considered a synchronous reply due to the low latency involved and/or because of the form of the request and the reply. In a particular example, where the communication received at the operation 702 corresponds to a remote procedure call, the indication may correspond to a (synchronous) result of that remote procedure call. In a yet more particular example, where the communication received at the operation 702 corresponds to a call to a web services API (e.g., a Representation State Transfer (REST) API (RESTful API) or a Simple Object Access Protocol (SOAP) API), the indication may be a result (e.g., return value or output) of that operation.

In another example of a possible form of the indication, the indication of the purchased virtual gift card could include an email message. For example, an email message including metadata such as may be used for configuring the client computer system 100 to allow transactions to be initiated using the purchased virtual gift card and/or a link to allow such metadata to be retrieved could be provided. In a particular example, such an email message could include a clickable link that, when clicked and otherwise selected, will invoked the mobile wallet application as a handler and will serve to allow the mobile wallet application to be configured to allow use of the virtual gift card with the mobile wallet application (e.g., to allow use of the mobile wallet application for making purchases using the virtual gift card).

In yet another example of a possible form of an indication, the indication may include more than one communication. For example, sending the indication may include sending both a reply and an email message as discussed above.

An example manner of processing a purchase, in at least near real-time, of a virtual gift card in accordance with specified requirements will now be discussed with reference to FIG. 8.

Figure 8:
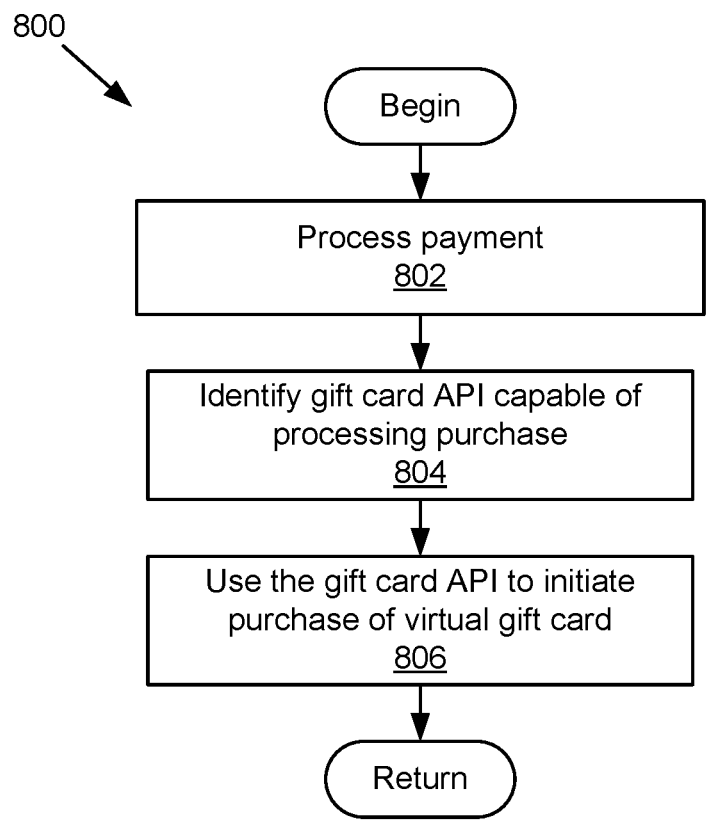
FIG. 8 is a flowchart showing operations performed in purchasing a virtual gift card.

FIG. 8 provides a flowchart depicting a method 800 for processing a purchase of a virtual gift card in accordance with specified requirements in real-time or near-real time. In performing the method 800, operations starting from an operation 802 and continuing onward, are performed by a processor of the server computer system 110. For example, where the server computer system 110 is an instance of the example computer server system 500, the operations may be performed by the processor 510 executing instructions such as, for example, from the memory 520 such as, for example, instructions that are part of a suitable instance of the application software 610 (FIG. 6). Notably, in some implementations, such software may be or be a part of a subroutine or module of software implementing the method 700. For example, the operations comprising the method 800 may, in some implementations, be sub operations of the operation 704 of the method 700 and the aforementioned specified requirements may correspond to the characteristics of identified in the communication received at the operation 702. In at least some such implementations, operations comprising the method 700 may be executed by the same processor(s) as one or more other operations of the method 700.

At the operation 802, payment for a virtual gift card is processed. This may take a variety of forms depending on the method of payment being employed. For example, a credit or debit card could be charged, a financial institution account could be debited, etc. In some cases, the payment method may be specified and/or identified in the specified requirements. For example, the payment method could, if applicable, have been identified in the communication received at the operation 702. Additionally or alternatively, the payment method may be associated with some account such as, for example, an account associated with the computing device from which the communication at the operation 702 was received and/or a user thereof. The payment is processed for an amount corresponding to a value amount of the intended purchase as set out in the specified requirements (e.g., the specified value amount such as may be included in the communication received at the operation 702, if applicable). For example, where the gift card is denominated in a currency, the payment may be in that same amount (or an equivalent amount after foreign exchange) as the value amount specified for the virtual gift card to be purchased. In another example, where the gift card is otherwise denominated (e.g., in some manner of proprietary "points"), the payment may be in a currency amount equivalent to the specified value amount (e.g., based on a defined cost per point). In some cases, in addition to a cost of the specified value amount, the purchase amount may also include an additional fee such as, for example, for a fee for processing the purchase (a processing fee).

Following the operation 802, an operation 804 is next.

At the operation 804, the server computer system 110 performs processing to identify an application programming interface that can be used to initiate processing of a purchase of a virtual gift card matching the specified requirements (e.g., matching characteristics included in the communication received at the operation 702). The application programming interface is identified from amongst a set of gift card merchant application programming interfaces known to the computing device. An example of such a set of application programming interfaces are the first gift card merchant API 132A, the second gift card merchant API 132B and the third gift card merchant API 132C—i.e., the APIs provided by members of the set of gift card merchant computer server systems 130.

In order to identify the application programming interface, the processor executing the operation 804 may compare capabilities and/or properties of the APIs from the collection of application programming interfaces to specified requirements.

As an example, it may be that application programming interfaces of various computer systems can each be used to purchase new virtual gift cards and/or refill gift cards of particular, potentially different types. An example of this is depicted in FIG. 1 where each of the members of the set of first gift card merchant computer server system 130A is labelled suggestive of a category of virtual gift card types such as may be accessed thereby. For example, the first gift card merchant computer server system 130A (and the first gift card merchant API 132A) are labelled with a hamburger and thus it may be that the first gift card merchant API 132A is usable to purchase food and/or restaurant-related gift cards, while the second gift card merchant computer server system 130B (and the second gift card merchant API 132B) is labelled with a shopping bag and may thus allow purchase of shopping (e.g., clothing) related gift cards, while the third gift card merchant computer server system 130C (and the third gift card merchant API 132C) is labelled with a film camera and thus may potentially allow purchase of entertainment related gift cards. Because only some of the known gift card merchant application programming interfaces (i.e., gift card merchant APIs known/available to the server computer system 110) may allow purchase of a virtual gift card of a particular gift card type, the application programming interface may be identified, at least in part, based on a gift card type identified in the specified requirements. Put another way, a gift card merchant API capable of processing a purchase of a virtual gift card may be identified based on the type of the virtual gift card that is to be purchased using the identified API (e.g., the gift card type indicated in the communication received at the operation 702).

As another example, it may be that the particular nature of the intended purchase (e.g., purchase a new card vs. refill an existing card) may need to be considering in identifying an API that can be used to initiate processing of the purchase. For example, it could be that a first API in the set is usable only for purchasing new virtual gift cards of a given type (and not for reloading) while another can service reloads of existing virtual gift cards of that same type. Notably, in such a case, if the intended purchase corresponds to a reload of an existing virtual gift card, only the latter API could be considered suitable and the first API would not be matched.

As yet another example, it may be that particular gift card merchant application programming interfaces have limits on amounts of purchases (e.g., the value of new virtual gift cards that may be purchased and/or a limit of reload amounts). In such a case, identifying a gift card merchant application programming interface may include comparing the specified value amount for the virtual gift card to be purchased (e.g., as set out in the specified requirements) against such limits so as to eliminate gift card merchant application programming interfaces having too low a limit (e.g., those having a limit less than the specified value amount or an equivalent thereto) from consideration as possible matches. Put another way, a gift card merchant API capable of processing a purchase of a virtual gift card may be identified based on the specified value amount that is to be purchased (e.g., the value amount specified in the communication received at the operation 702).

In some cases, it is possible that multiple APIs are capable of processing the requested purchase of a virtual gift card (e.g., a purchase of a gift card of an indicated type and a specified value amount). In such a case, one of those matching APIs may be selected based on one or more additional criteria. For example, transaction processing costs associated with matching APIs may be considered (e.g., to select the one with a lowest associated commission cost) and/or some defined ranking/priority of the APIs may be considered (e.g., a ranking could be pre-defined based on business criteria).

Following the identification, at the operation 804, of a gift card merchant application programming interface, from amongst a set of gift card merchant application programming interfaces, capable of processing a purchase of virtual gift card in accordance with the specified requirements, an operation 806 is next.

At the operation 806, the gift card merchant API identified at the operation 804 is used to initiate purchase of a virtual gift in accordance with specified requirements. For example, purchase of a virtual gift card of a gift card type indicated by the requirements and of a value amount specified therein may be initiated using the API.

The manner in which a given API is used to initiate a purchase of a virtual gift card may vary based on the specifics of the API. For example, it may be that one or more methods need to be invoked/function calls made and/or messages sent/received. Furthermore, the nature and manner of such invocations, calls, and/or exchanges may vary depending on, for example, factors such as for example, any messaging protocols employed, the particulars of the call structure of a given API, the need to authenticate, etc. For example, where the gift card application programming interface identified at the operation 804 utilizes a particular messaging protocol (e.g., SOAP or REST as discussed above), using that API to initiate purchase of a virtual gift card may include generating a message in conformity with that particular messaging protocol that can then be sent to the computer system hosting that API (i.e., the corresponding one of the set of first gift card merchant computer server system 130A) for invoking the identified gift card merchant API.

In some implementations of the method 800, one or more adapter components may be employed that implement primitives such as, for example, purchase of new virtual gift cards and/or reloading of existing virtual gift cards. Such primitives may, for example, be parameterized to allow for purchase of gift cards in accordance with specified requirements.

The API call or call(s) that must be invoked in order to initiate purchase of a given virtual gift card and the purchase itself are expected to be completed in a sufficiently short time that the overall purchase (including time taken for the operation 802 and operation 804 discussed) is completed in a time characterizable as at least near real-time (i.e., in real-time or near real-time as discussed above).

Following the operation 806, the method 800 is completed. Where, as illustrated, the method 800 corresponds to a subroutine, following the operation 806, flow control may return to the caller of the subroutine.

The method 800 is capable of variation. For example, in some implementations, operations comprising the method 800 may be performed in different orders. For example, it could be that the purchase of the virtual gift card (i.e., the operation 806) is initiated prior to processing payment (i.e. the operation 802). In a particular example, a hold on a payment amount (e.g., where the payment method is a credit card, an authorization may be obtained) could be placed prior to initiating purchase of the virtual gift card and then that hold could be converted to a charge/payment (e.g., by charging against a previously-obtained authorization where the payment method is a credit card) after the purchase has been initiated and/or after it completes.

Figure 9:
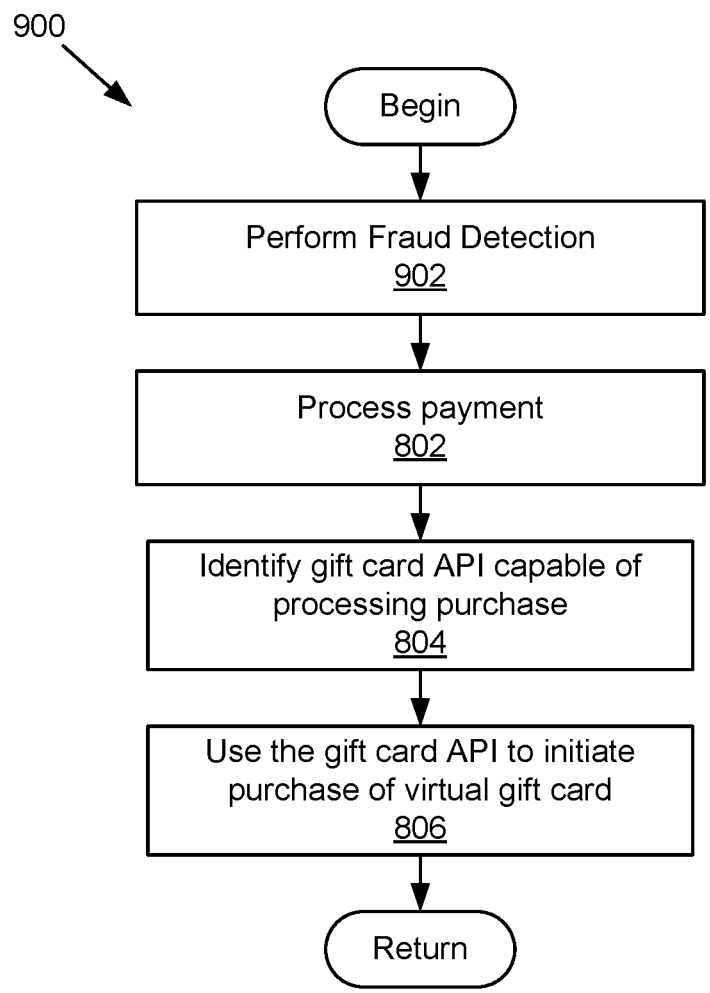
FIG. 9 is a flowchart showing operations performed in another manner of purchasing a virtual gift card.

As another example of possible variations on the method 800, a method 900, which is a variation on the method 800 but with the addition of an operation 902 will now be discussed with reference to FIG. 9. FIG. 9 provides a flowchart depicting a method 900 for processing a purchase of a virtual gift card in accordance with specified requirements in real-time or near-real time. As mentioned, the method 900 is a variation on the method 800 and similar considerations apply to the method 900 as to the method 800 as discussed above. For example, in performing the method 900, operations starting from an operation 902 and continuing onward, are performed by a processor of the server computer system 110.

At the operation 902, fraud detection is performed prior to the processing of a payment at the operation 802. In particular, at the operation 902, fraud detection is performed in order to determine whether or not a purchase of a gift card in accordance with the specified requirements (e.g., of an indicated gift card type and storing a specified value amount) should be blocked as possible fraud. A gift card purchase may, for example, be blocked if it is determined that a risk of fraud exceeds an acceptable tolerance. Such a tolerance may be defined taking into account practical and/or business considerations as further discussed below. Notably, this tolerance may be based on a variety of factors including, for example, an amount of the intended purchase. For example, a greater risk of fraud may be more acceptable for smaller (lower value) purchases. Notably, where an excessive fraud risk is detected and it is determined not to allow a purchase of a gift card in accordance with the specified requirements (i.e., that the purchase should be blocked), control flow may not proceed from the operation 902 to the operation 802 and, instead, the method 900 may terminate (e.g., by signalling an error condition). Where the method 900 is a subroutine of the method 700, the method 700 may, in turn, also terminate (e.g., by signalling an error condition).

Fraud detection itself may take variety of forms and a variety of data may be considered in performing fraud detection. Examples of data that may be considered in performing fraud detection will now be provided.

As a first example, fraud detection may consider data about the purchaser and/or the intended recipient of the virtual gift card. For example, identifiers of those customers (or one-way hashes thereof, for privacy) may be compared against a list of identifiers associated with flagged persons (or where the identifiers were one-way hashed, against one-way hashes of identifiers associated with flagged persons).

As a second example, fraud detection may consider data about the device used to initiate a given purchase. For example, information about a device from which the communication that was received at the operation 702 (FIG. 7) was received may be considered. Such information may, for example, include identifying characteristics of that computing device such as, for example, its network address (e.g., its Internet Protocol (IP) address) such as, for example, on the first network 120. In another example, other identifiers of the requesting computer system (i.e., the computing device requesting the purchase under consideration) may be obtained. For example, such identifiers could be included in the communication that was received at the operation 702. For example, where the requesting device is a mobile device as discussed above, such identifiers could, for example, include an International Mobile Equipment Identity (IMEI) of the device and/or an Integrated Circuit Card ID (ICCID) of a Subscriber Identity Module (SIM) installed therein. One or both of such identifiers could, for example, be compared against lists associated with devices reported stolen and/or previously used in committing fraud in order to identify fraud risk. In another example, a transaction could be blocked if it originates from an IMEI that has been associated with too many different ICCIDs in a short period of time as this could, for example, be an indication of fraud whereby transactions originating from different persons are being simulated using the same device.

As another example, location information about the computing device used to initiate a given purchase may be considered. For example, a geolocation may be determined by that device such as, for example, using a location component (e.g., a GPS receiver) of the device or via some other method such as, for example, based on cell-tower triangulation or information about available Wi-Fi signals near the device. Such a geolocation may then be provided to the computer server system performing the method 900. For example, the geolocation could be included in the communication received at the operation 702 (FIG. 7) (if applicable). Additionally or alternatively, a geolocation could be estimated based on other identifying information (e.g., network information such as, for example, network address and what provider(s) that address may be associated with). Geolocation may be compared in a variety of manners. For example, multiple requests from the same computing device in succession purporting to come from geographically-disparate geolocations (e.g., far apart locations) may be considered an indication of possible fraud given the unlikelihood/impossible of that device having actually travelled therebetween between purchases. Notably, such a condition could be detected by maintaining a log of recent geolocations associated with a given computing device and/or given device identifiers (e.g., IMEI and/or ICCID as discussed above).

As another example, information about the gift card type and/or the associated merchant may be considered. For example, fraud prone merchants or merchant categories may be subject to stricter fraud controls than those considered less prone to fraud.

As another example, information across transactions from a variety of sources may be considered. For example, a global restriction on total purchases (or purchases of gift cards of a given type and/or using a given gift card merchant application programming interface) may be limited to a total value/currency amount over a particular time interval or series of time intervals (e.g., daily, weekly and/or monthly purchase limits). Notably, such a restriction may act as a "circuit breaker" if other fraud controls fail and may serve to thwart large-scale fraud attempts and/or limit liability incurred thereby.

As another example, information about the payment method being used to fund a given purchase of a given virtual gift card may be considered. For example, some payment methods and/or manners of processing payments (e.g., payment "rails") may be considered to present a greater inherent fraud risk than other payment methods and may be subject to stricter fraud controls. In another example, payment method information may be compared together with other information such as, for example, geolocation information in order to assess the likelihood of fraud. In a particular example, a purchase made using a payment method (e.g., a credit card) with an associated address (e.g., a billing address) in one jurisdiction may be considered a greater risk of fraud if the purchase of the virtual gift is initiated responsive to a request made from a geolocation in a location geographically disparate from that address (e.g., in a different jurisdiction).

As another example, information about received communications such as, for example, the communication received at the operation 702 may be considered. For example, the communication received at the operation 702 may be evaluated to see if it is in a form expected from a known/trusted client program (e.g., such as the mobile wallet application mentioned above). Notably, even if a received communication is not malformed, if it deviates from the expected form, then it could still indicate possible fraud. For example, where a fraudster uses network monitoring tools to sniff communications between an application (e.g., a mobile wallet application) and the server computer system 110 in order to determine the communications protocol used to request purchases of virtual gift cards, a well-formed message according to that protocol could be received by the server computer system 110 formulated by the fraudster based on the results of that sniffing but deviating from the precise form used by the known/trusted program may suggest an untrusted application is being used to generate messages and may raise the spectre of possible fraud. For example, the fraudster could be using a tool to synthesize requests such as, for example, in order to try to perpetrate fraud on a large scale and/or to test information to see whether it may be accepted (e.g., to test out ill-obtained payment method information).

Notably, various types of data such as, for example, some or all of the example types of data discussed above may be considered in concert in performing fraud detection. For example fraud detection may include obtaining and considering information such as for example, a combination of some or all of (e.g., two or more of) the indicated gift card type to be purchased, the specified value amount for the intend purchase, the intended purchaser of the gift card, the intended recipient of the gift card, prior purchases of gift cards, and/or characteristics of the computing device from which communication(s) indicating one or more of the foregoing (e.g., the indicated gift card type and specified value amount) was received.

Whatever the data considered, the actual evaluation of fraud detection based on data being considered therefor may be performed in a variety of manners and may take a variety of forms. Examples of possible manners of using data to perform fraud detection will now be discussed.

As a first example of a manner of using data to perform fraud detection, a pre-defined scorecard may be evaluated using data. Such a scorecard may include a list of conditions to be checked, with certain conditions, for example, being associated with positive or negative point values. Depending on the scorecard, a high or a low score may be associated with a risk of fraud. In any event, the score resulting from evaluation of the score card may be compared to a defined threshold in order to determine whether it is too high (if a higher score indicates a higher risk of fraud) or too low (if a lower score indicates a lower trust) to allow the transaction to proceed, meaning that the purchase should be blocked. Notably, in some cases the threshold for the scorecard may be adaptive (e.g., based on data). For example, a higher threshold may be selected based on one or more factors such as, for example, the payment method being employed to fund the virtual gift card purchase, the amount of the purchase, and/or the type of the virtual gift card being purchased and/or other factors as discussed variously herein.

As a second example of a manner of using data to perform fraud detection, a rules engine may be employed to evaluate one or more fraud detection rules based on the data. Notably, such a rules engine could be used to implement a scorecard. However, it could also be that the rules evaluated by such a rules engine are, at least in some cases, more sophisticated than could be expressed using a scorecard. For example, a rules engine could be used to adaptively determine a fraud risk tolerance based on factors such as, for example, historical information about purchases. Additionally or alternatively, a rules engine may accommodate evaluation of conditions that require consideration of transaction histories such as, for example, to implement the "circuit breakers" discussed above. To summarize the possible use of a rules engine, an intended virtual gift card purchase may be evaluated for possible fraud by evaluating a set of fraud detection rules based on obtained information using rules to determine whether or not a given purchase of a virtual gift card should or should not/will or will not be blocked as possible fraud. Outputs from rule evaluation may take a variety of forms. For example, it could be that the rules serve to identify a purchase limit (e.g., based on a level of fraud risk identified using the rules) and then whether or not to allow the purchase is determined based on whether or not the specified value amount of the intended purchase is greater than or less than that limit (with it being allowed to go ahead if the specified value amount is less than the purchase limit).

As a third example of a manner of using data to perform fraud detection, an external fraud detection service could be employed. Data such as, for example, data of one or more of the types of data discussed above, may be sent to the fraud detection service. Such a communication of data may, for example, include one or more parameters of the requested virtual gift card purchase (e.g., one or both of the gift card type indicated in the specified requirements and/or the value amount specified therein) for use in fraud detection. For example, the communication of data may be made by the server computer system 110 and sent to a server associated with the fraud detection service (not shown) via a network for use in assessing fraud risk. In a particular example, such a communication may be sent using the communications module 530 where the server computer system 110 is or includes an instance of the example computer server system 500. Responsive to such a communication, the fraud detection service may be expected to reply with an indication of whether or not possible fraud is detected and/or a risk level identifying an estimated fraud risk based on that information. For example, an indication of fraud risk level may be received by the server computer system 110 from the remote fraud detection computer system (e.g., again via a network such as, for example, potentially using the communications module if applicable). Such a fraud detection service may allow consideration of fraud risk across transactions associated with mobile devices and/or particular payment methods beyond their use for purchase of virtual gift cards.

Notably, one or more of the above methods of fraud detection may be used in combination. For example, a given implementation of the method 900 could employ both a rules engine and fraud risk evaluation by an external fraud service.

The above is by way of example and is capable of variation without departing from the subject matter of the present application.

As an example of a possible variation, in some implementations it may be desirable to allow real-time or near real-time purchase of virtual gift cards for which there is no available gift card merchant application programming interface. In such cases, gift cards may be pre-purchased by other means and maintained in a pool (a virtual gift card "rack"). Such cards may then be used to fulfil purchase requests in real-time or near real-time by matching a request to purchase a virtual gift card with a pre-purchased card from the rack matching the specified requirements. Effectively, the requests are fulfilled from inventory in the pool/"on the rack". Notably, this process may be employed in an implementation of the operation 704 (FIG. 7) of the method 700 discussed above.

Notably, fulfilling requests for virtual gift card purchase from inventory as discussed above may require purchases of such cards to be of denominations selected from a set of value amounts for which inventory is maintained in the rack. Additionally, in order to consistently satisfy requests from the rack in real-time or near real-time, sufficient inventory would need to be maintained in the rack taking into account typical delays for replenishing inventory and expected demand.

A similar technique could also be employed where a merchant application program interface is available for purchasing a given gift card type but that API cannot meet the required timing requirements for real-time or near real-time fulfilment (and no alternative, faster API is available). In particular, cards could be pre-purchased using such an API (e.g., in set amounts as discussed above) and maintained in inventory on a rack for use in fulfilling purchase requests. Again, delays for replenishing inventory would need to be considered in determining quantities to maintain in inventory, in this case based on the expected demand and typical processing times for purchases made using the non real-time API. Conveniently, by, in effect, maintaining a cache of virtual gift cards pre-purchased using a given merchant API, real-time or near real-time gift card purchasing of virtual gift cards of a given type may be provided despite the unavailability of a sufficiently performant (low-latency) API for processing of such purchases in real-time and/or near real-time. Notably, this process may be employed in an implementation of the operation 704 (FIG. 7) of the method 700 discussed above and, in particular, to allow a non-performant gift card merchant application programming interface to be utilized in an implementation of the operation 704.

Finally, the reader is reminded that the purchases discussed above may include both purchases of new virtual gift cards and purchases of additional value for (i.e., reloads of) existing virtual gift cards. Put another way, a given purchase could, for example, correspond to a purchase of a new virtual gift card or a reload of an existing virtual gift card with the purchase adding some value amount (a "reload amount") to that virtual gift card.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
   a processor;
   a communications module coupled to the processor; and
   a memory coupled to the processor and storing instructions that, when executed by the processor, cause the processor to:
   receive, from a client device and using the communications module via a network, a communication indicating a request to reload a virtual gift card of an indicated gift card type and specifying a value amount and an identifier indicating the particular virtual gift card; and
   responsive to the communication, process, in at least near real-time, a reload of the virtual gift card of the indicated gift card type, the processing including:
      processing a payment corresponding to the specified value amount;
      identifying, from amongst a plurality of application programming interfaces, an application programming interface capable of processing the reload of the virtual gift card of the indicated gift card type; and
      using the identified application programming interface to add the specified value amount to the virtual gift card; and
   send an indication of the reloaded virtual gift card via the network using the communications module to a mobile computing device different from the client device for use in configuring the mobile computing device, wherein identifying, from amongst the plurality of application programming interfaces, an application programming interface capable of processing the reload of the virtual gift card of the indicated gift card type includes identifying the application programming interface based on the specified value amount.

2. The computer system of claim 1, wherein the application programming interface is identified based on the indicated gift card type.

3. The computer system of claim 1, wherein the identified application programming interface utilizes a particular messaging protocol and wherein using the identified application programming interface to add the specified amount to the virtual gift card includes generating a message in conformity with the particular messaging protocol for invoking the identified application programming interface.

4. The computer system of claim 1, wherein the indication of the reload of the virtual gift card corresponds to a synchronous reply to the request.

5. The computer system of claim 1, wherein the indication of the reloaded virtual gift card includes an email message.

6. The computer system of claim 1, wherein processing the reload of the virtual gift card further includes:
prior to processing the payment, performing fraud detection to determine that the reload of the virtual gift card of the indicated gift card type will not be blocked as possible fraud.

7. The computer system of claim 6, wherein performing fraud detection to determine that a reload of the virtual gift card of the indicated gift card type will not be blocked as possible fraud includes:
obtaining information including information related to two or more of the indicated gift card type, the specified value amount, an intended reloader of the virtual gift card, an intended recipient of the virtual gift, prior purchases of virtual gift cards, or the client device from which the communication indicating the gift card type and specifying the value amount was received; and
assessing the reload by evaluating a plurality of fraud detection rules based on the obtained information using a rules engine to determine that the reload of the virtual gift card of the indicated gift card type will not be blocked as possible fraud.

8. The computer system of claim 6, wherein performing fraud detection to determine that a reload of the virtual gift card of the indicated gift card type will not be blocked as possible fraud includes:
identifying a reload limit based on an identified level of fraud risk; and
determining that the specified value amount is less than the reload limit.

9. The computer system of claim 6, wherein performing fraud detection to determine that a requested reload of the virtual gift card of the indicated gift card type will not be blocked as possible fraud includes:
sending, to a remote fraud detection computer system using the communications module via the network, a second communication including an indication of one or more parameters of the requested virtual gift card reload including at least one of the indicated gift card type and the specified value amount; and
receiving, from the remote fraud detection computer system using the communications module via the network responsive to the second communication, an indication of a fraud risk level associated with the requested virtual gift card reload.

10. A computer-implemented method comprising:
receiving, from a client device and via a network, a communication indicating a request to reload a virtual gift card of an indicated a gift card type and specifying a value amount and an identifier indicating the particular virtual gift card; and
responsive to the communication, processing, in at least near real-time, a reload of the virtual gift card of the indicated gift card type, the processing including:
processing a payment corresponding to the specified value amount;
identifying, from amongst a plurality of application programming interfaces, an application programming interface capable of processing the reload of the virtual gift card of the indicated gift card type; and
using the identified application programming interface to add the specified value amount to the virtual gift card; and
sending an indication of the reloaded virtual gift card via the network using the communications module to a mobile computing device different from the client device for use in configuring the mobile computing device,
wherein identifying, from amongst the plurality of application programming interfaces, an application programming interface capable of processing the reload of the virtual gift card of the indicated gift card type includes identifying the application programming interface based on the specified value amount.

11. The computer-implemented method of claim 10, wherein the application programming interface is identified based on the indicated gift card type.

12. The computer-implemented method of claim 10, wherein using the identified application programming interface to add the specified amount to the virtual gift card includes generating a message in conformity with a particular messaging protocol and utilizing the particular messaging protocol by invoking the identified application programming interface.

13. The computer-implemented method of claim 10, wherein processing the reload of the virtual gift card further includes:
prior to processing the payment, performing fraud detection to determine that the reload of the virtual gift card of the indicated gift card type will not be blocked as possible fraud.

14. The computer-implemented method of claim 13, wherein performing fraud detection to determine that the reload of the virtual gift card of the indicated gift card type will not be blocked as possible fraud includes:
obtaining information including information related to two or more of the indicated gift card type, the specified value amount, an intended reloader of the virtual gift card, an intended recipient of the virtual gift, prior purchases of virtual gift cards, or the client device from which the communication indicating the gift card type and specifying the value amount was received; and
assessing the reload by evaluating a plurality of fraud detection rules based on the obtained information using a rules engine to determine that a reload of the virtual gift card of the indicated gift card type storing the specified value amount will not be blocked as possible fraud.

15. A non-transitory computer-readable storage medium storing instructions which, when executed by a processor of a computer system, cause the processor to:

receive, from a client device and via a network, a communication indicating a request to reload a virtual gift card of an indicated gift card type and specifying a value amount and an identifier indicating the particular virtual gift card; and responsive to the communication, process, in at least near real-time, a reload of the virtual gift card of the indicated gift card type, the processing including:

processing a payment corresponding to the specified value amount;

identifying, from amongst a plurality of application programming interfaces, an application programming interface capable of processing the reload of the virtual gift card of the indicated gift card type; and using the identified application programming interface to add the specified value amount to the virtual gift card; and send an indication of the reloaded virtual gift card via the network using the communications module to a mobile computing device different from the client device for use in configuring the mobile computing device, wherein identifying, from amongst the plurality of application programming interfaces, an application programming interface capable of processing the reload of the virtual gift card of the indicated gift card type includes identifying the application programming interface based on the specified value amount.

16. The computer system of claim 1, wherein identifying, from amongst the plurality of application programming interfaces, an application programming interface capable of processing the reload of the virtual gift card of the indicated gift card type includes comparing the specified value amount against a limit.

17. The computer system of claim 1, wherein identifying, from amongst the plurality of application programming interfaces, an application programming interface capable of processing the reload of the virtual gift card of the indicated gift card type includes selecting the application programming interface based on transaction processing costs associated with the application programming interface.

18. The computer system of claim 1, wherein identifying, from amongst the plurality of application programming interfaces, an application programming interface capable of processing the reload of the virtual gift card of the indicated gift card type includes selecting the application programming interface based on a defined ranking of the plurality of application programming interfaces.

19. The computer system of claim 1, wherein the indication includes a clickable wallet configuration link.

\* \* \* \* \*